United States Patent [19]

Bass

[11] Patent Number: 5,129,828
[45] Date of Patent: Jul. 14, 1992

[54] REWIND TRAILER LIGHT CONNECTOR

[76] Inventor: Chauncie L. Bass, 248 Schaub, Shreveport, La. 75115

[21] Appl. No.: 685,284

[22] Filed: Apr. 15, 1991

[51] Int. Cl.$^5$ .............................................. H01R 33/00
[52] U.S. Cl. ...................... 439/35; 191/12.2 R; 439/501; 439/503
[58] Field of Search .............. 439/35, 503, 34, 501; 280/420, 422; 191/12.2 R, 12.4; 242/85.5 R, 86.6, 86.64, 107, 107.12, 107.14

[56] References Cited

U.S. PATENT DOCUMENTS

| | | | |
|---|---|---|---|
| 2,391,141 | 12/1945 | Dour et al. | 191/12.2 R |
| 3,815,078 | 6/1974 | Fedrick | 339/28 R |
| 3,920,308 | 11/1975 | Murray | 339/119 C |
| 4,006,952 | 2/1977 | Puckett | 339/5 RL |
| 4,653,833 | 3/1987 | Czubernat et al. | 339/119 C |
| 4,846,697 | 7/1989 | Rodgers | 439/35 |
| 4,940,427 | 7/1990 | Pearson | 439/501 |

Primary Examiner—Eugene F. Desmond
Attorney, Agent, or Firm—John M. Harrison

[57] ABSTRACT

A rewind trailer light connector which is characterized by a rewind housing attached to either the frame, bumper or trailer hitch of a towing vehicle or the trailer tongue of a trailer and fitted with wiring having either a plug or receptacle for receiving the mating plug or receptacle of the trailer or vehicle to illuminate lights on the trailer. In a preferred embodiment the rewind trailer light connector is characterized by a split housing fitted with a central opening and a coil spring, such that the plug or receptacle can be retracted against the housing when not in use and extended from the housing for connection to the corresponding plug or receptacle component during use.

12 Claims, 1 Drawing Sheet

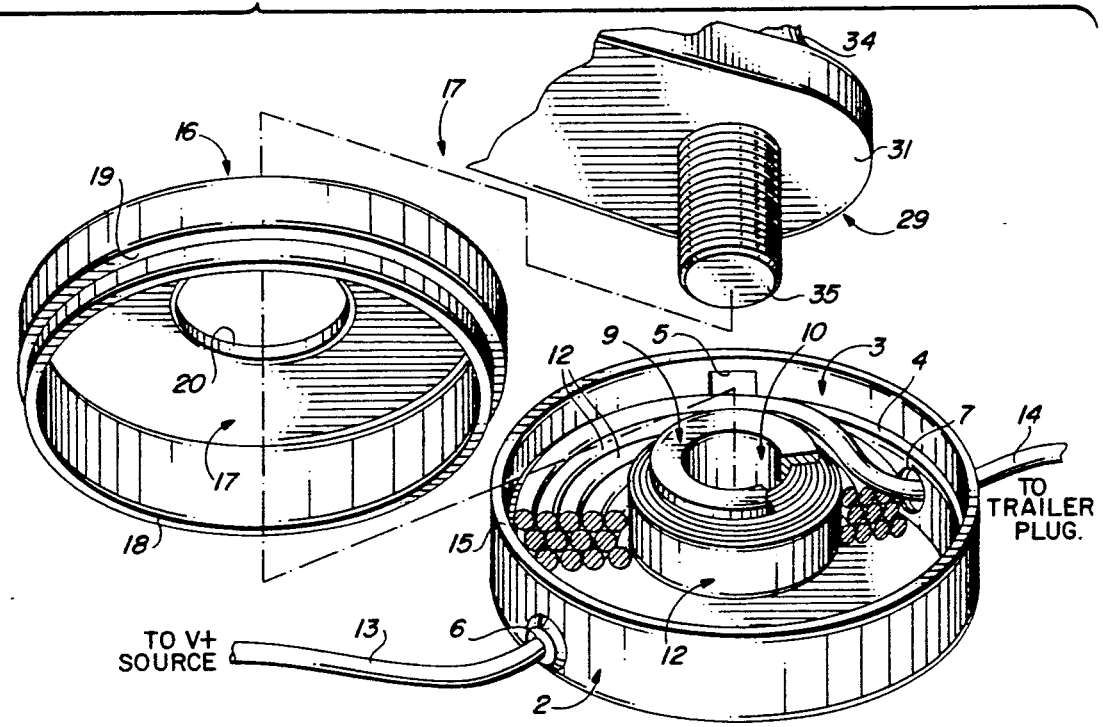

REWIND TRAILER LIGHT CONNECTOR

BACKGROUND OF THE INVENTION

1. Field of the Invention

This invention relates to lighting attachments for trailers and vehicles and more particularly, to a rewind trailer light connector which is connected to the bumper, frame or trailer hitch of a towing vehicle in one embodiment and utilized to connect conventional trailer lights to the vehicle while the trailer is towed by the vehicle. Alternatively, the rewind trailer light connector can be secured to the trailer and a plug or receptacle component extended from the housing for connection to a mating plug or receptacle in the vehicle wiring assembly while the trailer is being towed.

Cars, trucks and other vehicles are frequently used to pull trailers of various description and it is necessary for safety purposes to interconnect the brake lights, turn signal indicators and running lights of the towing vehicle with the corresponding lights on the trailer. Various types of wiring harness configurations and interconnecting means are used to achieve this purpose, typically including a wiring plug attached to the trailer wiring harness and a corresponding socket or receptacle secured to the vehicle wiring system.

A common problem realized in installation of wiring harness for towing vehicles for the purpose of attaching the wiring harness to corresponding trailer wiring when towing a trailer, is that of securing the vehicle wiring harness plug or receptacle in a convenient location when the trailer is disconnected from the vehicle. These wiring harness are typically fitted with male or female plugs or receptacles which usually dangle or trail behind the vehicle as the vehicle is operated when a trailer is not attached to the trailer hitch. The plug or receptacle is therefore frequently damaged by contact with the road surface or the frame of the towing vehicle while travelling and detracts from the overall streamlining and positive esthetic appearance of the towing vehicle.

2. Description of the Prior Art

Attempts to minimize or elimnate the damage due to trailing plugs or receptacles attached to the ends of wiring harnesses in vehicle includes wrapping the wiring around the trailer hitch or otherwise shortening the length of the wiring harness adjacent to the plug or receptacle to prevent the plug or receptacle from being damaged by contact with the road or the vehicle. These attempts frequently cause the wiring to crimp or stretch, sometimes making it inoperative. At best, the randomly dangling plug or receptacle also presents an unsightly appearance.

The use of extension cords retractively mounted in housings has proved to be a convenient technique for storing extended lengths of cord and facilitating use of the cord at selected distances from the housing. U.S. Pat. No. 3,815,078, dated Jun. 4, 1974, to Nicolas W. Fedrick, details a "Retractable Extension Cord Unit" of this design. The retractable extension cord unit includes a small housing within which the cord can be stored. The housing is formed from two relatively rotatable members, the rotation of which enables selected extension or retraction of the cord. A "Ready Stored Power Cord" is detailed in U.S. Pat, No. 3,920,308, dated Nov. 18, 1975, to Harry C. Murray. The device includes a cord spool slidably arranged in a receptacle for movement between a position in which the spool is entirely within the receptacle, to a position in which the spool is out of the receptacle. Multiple spools, each provided with an associated power cord, may be arranged in a single receptacle. Electrical sockets are connected to the cords and are removably mountable in associated apertures provided in a cover which is pivotally mounted on the receptacle and functions as an electrical outlet cover plate when the cover is in a position blocking communication with the receptacle. U.S. Pat. No. 4,006,952, dated Feb. 8, 1977, to William E. Puckett, details a "Battery Jump Cable Apparatus". The apparatus is designed to transfer power from the battery of a service vehicle to the battery of a second vehicle and utilizes a spring-loaded reel for storing the jumper cables in the service vehicle. One of the cables is permanently connected to the frame of the service vehicle and the other cable is permanently connected to the positive terminal of the battery in the service vehicle. A "Retractable Booster Cable Device" is detailed in U.S. Pat. No. 4,653,833, dated Mar. 31, 1987, to Donald A. Czubernat, et al. The device includes a container which rotatably supports a spool by means of two spool end walls. The spool is divided into two substantially equal portions by a divider wall intermediate the end walls. A twin element cable passes through the hollow center of the spool, extends through each spool portion and exits the container through exits in each end thereof. The cable is centered such that substantially equal lengths extend from both exits. A deployed cable is stowed by rotating the spool in a first direction and the cable is deployed from a stowed position by simultaneously pulling both ends of the cable from the container, causing the spool to rotate in the second direction. U.S. Pat. No. 4,846,697, dated Jul. 11, 1989, to E. Walter Rogers details a "Cable for Interconnecting Lighting Systems of Towing Vehicle and Trailer". The patent details a universal wiring connection cord for interconnecting various types of wiring sockets that are interconnected with the electrical lighting system of a towing vehicle to various types of wiring plugs that may be interconnected with the electrical lighting system of a trailer. The device includes a central cable housing having a number of stranded electrical wires bundled therein. The bundled electric wires extend from a first end of the central cable and are provided with electrical connectors adapted to be engaged with the electrical terminals housed within the wiring socket mounted to the towing vehicle. The ends of the wires extend from the first end of the central cable and are free to move with respect to one another, in order to be positioned in the pin-out pattern of the wiring socket. Electrical wires also extend from the opposing second end of the central cable and are provided with electrical connectors adapted to engage terminals housed in the wiring plug mounted to the trailer. U.S. Pat. No. 4,940,427, dated Jul. 10, 1990, to Linnea Pierson, details an "Electrical Trailer Connector Retainer". The retainer is designed for use with an electrical wire connector of the type commonly used to provide electrical connection of a trailer device to the electrical system of a towing vehicle. The retainer is mountable either on the bumper of the towing vehicle or the tongue of the trailer device and permits the electrical wire connector, used for transferring electrical power to the trailer from the electrical supply system of the towing vehicle, to be safely and conveniently stowed or retained when not in use and readily available for electrical connection when needed.

It is an object of this invention to provide a rewind trailer light connector system for retractably interconnecting the electrical lighting system of a towing vehicle and the electrical lighting system of a trailer to be towed.

Another object of this invention is to provide a rewind trailer light connector which serves to interconnect a spring-loaded wiring connector wired into the electrical lighting system of a towing vehicle to a wiring plug interconnected with the electrical lighting system of a trailer, wherein wiring coiled in the wiring connector is selectively extended and rewound as it is alternately connected and disconnected from the electrical lighting system of the trailer.

Yet another object of this invention is to provide a rewind trailer light connector having a housing which may be installed either on a towing vehicle or on a trailer to interconnect wiring connections on the trailer and vehicle and rewind the wiring connection on the trailer or vehicle into the housing, thereby preventing damage to the plug or receptable attached to the wiring which is rewound in the housing.

Still another object of this invention is to provide a rewind trailer light connector system which is characterized by a first rewind trailer light connector located on the towing vehicle and a second rewind trailer light connector located on the trailer, which rewind trailer light connectors are fitted with a mating plug and receptacle, respectively, for interconnection when the trailer is attached to the vehicle and retraction to the respective rewind trailer light connector housings when the trailer is disconnected from the vehicle.

Still another object of the invention is to provide a rewind trailer light connector for attachement to the bumper, frame or trailer hitch of a towing vehicle and includes a split housing fitted with a lock to facilitate extension of a length of electrical wiring coiled in the housing and a plug or receptacle terminating the wiring, to a selected point, locking the wiring at this selected extension for coupling to a corresponding receptacle or plug attached to the wiring of a trailer when the trailer is coupled to the vehicle and retraction of the wiring into the housing and the plug or receptacle to the housing by manipulating the lock when the trailer is disconnected from the vehicle.

Still another object of the invention is to provide a rewind trailer light connector apparatus which is mounted to a trailer hitch secured to a vehicle and includes a housing fitted with a hub in the center for receiving the trailer hitch ball bolt and mounting the apparatus to the trailer hitch and further including a coil for automatically retracting a length of electrical wiring into the apparatus. The wiring can be extended against the bias of the spring attachment to corresponding wiring located in a trailer when the trailer is coupled to the trailer hitch ball.

SUMMARY OF THE INVENTION

These and other objects of the invention are provided in a rewind trailer light connector which may be connected to the bumper, frame or trailer hitch of a towing vehicle and includes a rewind housing provided with a coil spring for extending and retracting a segment of wiring and a plug or receptacle attached to the wiring, from the housing to engage the corresponding plug or receptacle provided in the associated wiring of a trailer when the trailer is secured to the towing vehicle. In a preferred embodiment the housing is fitted with a lock for locking the vehicle wiring at a selected extension from the housing. In other preferred embodiments the rewind trailer light connector is provided with a central opening for receiving a conventional blot or the ball bolt of a trailer hitch ball and mounting the rewind trailer light connector on the trailer tongue or trailer hitch of the towing vehicle.

BRIEF DESCRIPTION OF THE DRAWING

The invention will be better understood by reference to the accompanying drawing, wherein:

FIG. 1 is a side sectional view of a first preferred embodiment of the rewind trailer light connector of this invention;

FIG. 2 is a bottom view, partially in section, of the rewind trailer light connector illustrated in FIG. 1;

FIG. 3 is a side sectional view of another preferred embodiment of the rewind trailer light connector;

FIG. 4 is a side view, partially in section, of yet another preferred embodiment of the rewind trailer light connector;

FIG. 5 is still another preferred embodiment of the rewind trailer light connector; and FIG. 6 is an exploded view of the rewind trailer light connector illustrated in the embodiments of FIGS. 3-5.

DESCRIPTION OF THE PREFERRED EMBODIMENTS

Referring initially to FIGS. 1, 2 and 6 of the drawing, in a first preferred embodiment the rewind trailer light connector of this invention is generally illustrated by reference numeral 1. The rewind trailer light connector 1 is characterized by a bottom housing 2 and a companion top housing 16, fitted with a housing bracket 23, which is attached to the bottom of the vehicle bumper 28 by means of bracket bolts 24 and corresponding nuts 45. In FIGS. 1 and 2 a spring pin 8 secures the top housing 16 to the bottom housing 2 and encloses coils of coiled wiring 12, the plug wiring 14 segment of which projects through a wiring opening 7 in the bottom housing 2 and top housing 16. A plug receptacle 26 is attached to the end of the plug wiring 14 and is adapted to engage a corresponding plug 25, secured to trailer wiring 46 which is, in turn, connected to the lights (not illustrated) of a trailer (not illustrated). In a most preferred embodiment of the invention a sliding lock 11 is provided on the top housing 16, and operates in the same manner as a conventional carpenter's tape to facilitate extension of the plug wiring 14 from the bottom housing 2 and top housing 16 and locking a selected length of the plug wiring 14 from the bottom housing 2 and top housing 16. A length of source wiring 13 projects from the coiled wiring 12 through a second wiring opening 7 in the bottom housing 2 and top housing 16 is attached to the battery or lighting system of a towing vehicle (not illustrated) to supply power to the plug receptacle 26. As further illustrated in FIGS. 1 and 2, the trailer hitch 29 includes a bumper plate 30, which is mounted by means of mount bolts 43 and nuts 45 to the vehicle bumper 28. A ball plate 31 extends from the bumper plate 30 and includes a gusset 32, for support purposes. A ball hitch 33 is mounted on the ball plate 31 and includes a coupling ball 33a, a ball hitch shoulder 34, seated on the ball plate 31 and a ball hitch bolt 35, which projects through an opening in the ball plate 31 and receives a lock washer 37 and a ball hitch nut 36 for tightening the ball hitch 33 on the ball plate 31.

Referring now to FIG. 3 and again to FIG. 6 of the drawing, in another preferred embodiment of the invention the bottom housing 2 of the rewind trailer light connector 1 is characterized by a bottom housing cavity 3 and a bottom housing lip 4, with a lock window 5 provided therein, as illustrated in FIG. 6. Wiring grommets 6 are seated in the oppositely-disposed wiring openings 7, provided in the peripheral walls of the bottom housing 2, for receiving the source wiring 13 and the plug wiring 14 components of the coiled wiring 12, the latter of which is coiled inside the bottom housing cavity 3 of the bottom housing 2. A hub 9 is provided in the bottom housing 2 and extends upwardly into the bottom housing cavity 3 and receives a coil spring 21, as further illustrated in FIG. 6. A hub bore 10 is provided in the center of the hub 9 for receiving the ball hitch bolt 35 of the ball hitch 33 and securing the bottom housing 2 and the top housing 16 on the ball plate 31 of the trailer hitch 29 by means of the lock washer 37 and ball hitch nut 36. As further illustrated in FIG. 6, the top housing 16 is provided with a top housing cavity 17, a top housing rim 18, which seats against the bottom housing lip 4 in the bottom housing 2 and a top housing shoulder 19, which matches the corresponding bottom housing rim 15 in the bottom housing 2. A hub opening 20 is also provided in the top housing 16 for accomodating the ball hitch bolt 35 when the top housing 16 is seated on the bottom housing 2, as illustrated in FIGS. 3 and 4. Accordingly, as further illustrated in FIGS. 3 and 4, it will be appreciated that the plug wiring 14 segment of the coiled wiring 12 can be extended from the bottom housing cavity 3 of the bottom housing 2 against the bias of the coil spring 21 to located the plug receptacle 26 in close prioximity to the corresponding plug 25 of the trailer wiring 46 (illustrated in FIG. 1) and removably insert the plug 25 into the plug receptacle 26 and couple the trailer wiring 46 to the plug wiring 14, to illuminate the trailer lights (not illustrated). Furthermore, when the trailer (not illustrated) is removed from the ball hitch 33, the plug 25 can be removed from contact with the plug receptacle 26 and the plug wiring 14 allowed to coil inside the bottom housing cavity 3 and bottom housing in the coiled wiring 12, responsive to operation of the coil spring 21.

It will be appreciated by those skilled in the art that a lock 11 can be fitted in the lock window 5 and the bottom housing 2 illustrated in FIG. 6, to facilitate extension of the plug wiring 14 a selected distance from the bottom housing 2 and locking that portion of the plug wiring 14 into position, as heretofore described. As illustrated in FIG. 3, the ball plate 31 of the trailer hitch 29 is removably connected to the bumper 28 means of carriage bolts 44 (one of which is illustrated) and corresponding nuts 45.

Referring to FIG. 4 of the drawings, this embodiment of the trailer hitch 29 is characterized by a drawbar 39, provided with spaced drawbar pin openings 40 for receiving a drawbar pin (not illustrated) and a drawbar receptacle 41, fitted with receptacle pin openings 42 and shaped for attachment to the bumper or frame of a vehicle (not illustrated). Accordingly, the drawbar 39 may be inserted into the drawbar receptacle 41 and the drawbar pin openings 40 aligned with the receptacle pin openings 42 to transversely receive a drawbar pin (not illustrated) and removably secure the drawbar 39 to the drawbar receptacle 41.

Referring now to FIGS. 5 and 6 of the drawing, in another preferred embodiment of the invention the top housing 16 and bottom housing 2 of the rewind trailer light connector 1 are secured to the bottom of a trailer tongue 38 by means of a mount bolt 43 and a corresponding nut 45. A conventional coupler 38a is attached to the trailer tongue 38 for fitting over the coupling ball 33a of the ball hitch 33 and removable securing the trailer to the vehicle. The plug wiring 14 is extended through the wiring grommet 6 in a wiring opening 7 in the bottom housing 2 against the bias of the coil spring 21, in order to position the plug receptacle 26 in close proximity to a corresponding plug 25, attached to the trailer wiring 46. Accordingly, it will be appreciated that the rewind trailer light connector 1 which is attached to the trailer tongue 38 is identical in design to the rewind trailer light connector 1 secured to the trailer hitch 29 as illustrated in FIGS. 1-4, except for location of the plug 25 on the end of the trailer wiring 46. Moreover, it will be further appreciated by those skilled in the art that identical rewind trailer light connectors 1 can be attached to both the trailer tongue 38 and to the trailer hitch 29 of a vehicle, with the plug 25 and the plug receptacle 26 attached to the plug wiring 14 which serves either the trailer or the vehicle.

It will be still further appreciated by those skilled in the art that the rewind trailer light connector of this invention offers a convenient, inexpensive and efficient technique for interconnecting the rear brake lights, turn signal indicators and night running lights within the electrical system of a trailer to the corresponding electrical system of a towing vehicle, in order to allow drivers following the trailer to anticipate stops and turns and view the trailer at night. The rewind trailer light connector eliminates the necessity for implementing wiring interconneciton kits which include wiring sockets interconnected with the electrical lighting system of the towing vehicle and a corresponding wiring plug interconnected with the electrical lighting system of the trailer. Furthermore, one or more of the rewind trailer light connectors can be utilized either on the trailer hitch of the vehicle or the tongue of the trailer or both, as desired, and the plug 25 and plug receptacle 26 elements can be interchanged, as desired. Moreover, the device can be used in a wide variety of trailer hitch design applications and can even be mounted on the vehicle bumper or frame, with the plug or receptacle projecting through openings in the bumper, such as license plate illuminating light openings, in non-exclusive particular. As described above, a lock system can also be provided in the rewind trailer light connector to facilitate extension of a selected length of wiring on the device, or it may be allowed to freely rewind by operation of an internal spring, as described above.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A rewind trailer light connector for connecting the vehicle wiring of a towing vehicle having a trailer hitch fitted with a hitch ball and a hitch bolt extending from the hitch ball to the trailer wiring of a trailer, comprising a housing carried by the towing vehicle; an opening provided in said housing for receiving the hitch bolt and mounting said housing on the trailer hitch; a length of vehicle wiring coiled in said housing, with a connecting segment of the vehicle wiring extendible from said housing; bias means provided in said housing in biasing engagement with the vehicle wiring, whereby said connecting segment is selectively extendible from said housing in biased relationship for attachment to the trailer wiring and retractable into said housing when detached from the trailer wiring, responsive to operation of said bias means.

2. the rewind trailer light connector of claim 1 further comprising hub means provided in said housing and wherein said opening is provided in said hub means.

3. The rewind trailer light connector of claim 1 wherein said bias means further comprises a coil spring.

4. The rewind trailer light connector of claim 1 further comprising hub means provided in said housing and wherein said opening is provided in said hub means and said bias means further comprises a coil spring encircling said hub means.

5. The rewind trailer light of claim 1 further comprising a connecting receptacle provided on said connecting segment of said vehicle wiring and a connecting plug provided on the trailer wiring for removable engaging said connecting receptacle and removably connecting said vehicle wiring to said trailer wiring.

6. The rewind trailer light of claim 1 further comprising a connecting plug provided on said connecting segment of said vehicle wiring and a connecting receptacle provided on the trailer wiring for removably engaging said connecting plug and removably connecting said vehicle wiring to said trailer wiring.

7. A rewind trailer light connector for connecting the vehicle wiring of a towing vehicle having a trailer hitch fitted with a hitch ball, to the trailer wiring of a trailer, comprising a housing carried by the trailer; a length of said trailer wiring coiled in said housing, with a connecting segment of the trailer wiring extendible from said housing; bias means provided in said housing in biasing engagement with the trailer wiring; and mounting means engaging said housing and the trailer for mounting said housing on the trailer, whereby said connecting segment is selectively extendible from said housing in biased relationship for attachment to the vehicle wiring and retractable into said housing when detached from the vehicle wiring, responsive to operation of said bias means.

8. The rewind trailer light connector of claim 7 wherein said bias means further comprises a coil spring.

9. The rewind trailer light connector of claim 7 further comprising an opening provided in said housing for receiving a mount bolt and mounting said housing to the trailer.

10. The rewind trailer light connector of claim 9 wherein said bias means further comprises a coil spring.

11. A pair of rewind trailer light connectors for connecting the vehicle wiring of a towing vehicle to the trailer wiring of a trailer connected to the vehicle, comprising a first housing carried by the vehicle; a length of said vehicle wiring coiled in said first housing, with a connecting segment of said vehicle wiring projecting from said housing; first bias means provided on said first housing in biasing engagement with said vehicle wiring; a second housing carried by the trailer; a length of said trailer wiring coiled in said second housing, with a connecting segment of said trailer wiring projecting from said second housing; and second bias means provided in said second housing in biasing engagement with said trailer wiring, whereby said connecting segment of said vehicle wiring is selectively extendible from said first housing against the bias of said first bias means and said connecting segment of said trailer wiring is selectively extendible from said second housing against the bias of said second bias means, for removable attachment of said connecting segment of said vehicle wiring to said connecting segment of said trailer wiring.

12. The rewind trailer light connector of claim 11 wherein said first bias means further comprises a first coil spring and said second bias means further comprises a second coil spring.

* * * * *